US012644779B2

(12) United States Patent
Ding et al.

(10) Patent No.: US 12,644,779 B2
(45) Date of Patent: Jun. 2, 2026

(54) TEMPERATURE SENSOR AND CONNECTOR ASSEMBLY

(71) Applicants: Measurement Specialties (China) Ltd., Shenzhen City (CN); Measurement Specialties (Chengdu) Ltd, Chengdu (CN); Tyco Electronics (Shanghai) Co., Ltd., Shanghai (CN)

(72) Inventors: Dong Ding, Chengdu (CN); Aibing (Alan) Dong, Shanghai (CN); Liqiang (Gino) Yao, Shanghai (CN); Yuming Xiao, North Shenzhen (CN)

(73) Assignees: Tyco Electronics (Shanghai) Co., Ltd., Shanghai (CN); Measurement Specialties (China) Ltd., Shenzhen City (CN); Measurement Specialties (Chengdu) Ltd., Chengdu (CN)

( * ) Notice: Subject to any disclaimer, the term of this patent is extended or adjusted under 35 U.S.C. 154(b) by 321 days.

(21) Appl. No.: 18/467,270

(22) Filed: Sep. 14, 2023

(65) Prior Publication Data

US 2024/0085245 A1 Mar. 14, 2024

(30) Foreign Application Priority Data

Sep. 14, 2022 (CN) .......................... 202211114646.3

(51) Int. Cl.
G01K 1/14 (2021.01)
H01M 10/48 (2006.01)
(52) U.S. Cl.
CPC ............ G01K 1/14 (2013.01); H01M 10/486 (2013.01)

(58) Field of Classification Search
CPC .. G01K 1/08; G01K 1/12; G01K 1/14; G01K 1/143; G01K 1/146; H01M 10/486; H01M 10/48
See application file for complete search history.

(56) References Cited

U.S. PATENT DOCUMENTS 5,569,587 A * 10/1996 Waggoner ........... C09B 23/0008
435/6.12
10,054,492 B2 * 8/2018 Shiraki .................... G01K 1/08
(Continued)

FOREIGN PATENT DOCUMENTS

WO WO-2011016942 A1 * 2/2011 ............... G01K 1/18

OTHER PUBLICATIONS

Computer translation of WO_2011016942_A1 (Year: 2025).*

*Primary Examiner* — Randy W Gibson
(74) *Attorney, Agent, or Firm* — Barley Snyder

(57) ABSTRACT

A connector assembly comprises a connector and a temperature sensor. The connector includes a connector housing formed with a sensor slot, and a conductive terminal arranged in the connector housing. The temperature sensor is inserted into the sensor slot and is adapted to detect a temperature of the conductive terminal in the connector. The sensor includes a shell having a first sidewall in thermal contact with the conductive terminal, and a second sidewall opposite to the first sidewall. The second sidewall defines an interference fit portion extending from an outer surface thereof. The interference fit portion forms an interference fit with an inner wall of the sensor slot. A remaining portion of the second sidewall except for the interference fit portion is separated from the inner wall of the sensor slot by a predetermined gap. The sensor further includes a temperature sensing element arranged in the shell.

20 Claims, 13 Drawing Sheets

(56)          References Cited

U.S. PATENT DOCUMENTS

| | | | |
|---|---|---|---|
| 10,436,648 B2 * | 10/2019 | Yoshihara | G01K 1/16 |
| 11,539,174 B2 * | 12/2022 | Yamanashi | H01R 13/6683 |
| 11,588,280 B2 * | 2/2023 | Yamanashi | H01R 13/6683 |
| 12,283,404 B2 * | 4/2025 | Fukuchi | H01B 7/40 |
| 2003/0146819 A1 * | 8/2003 | Shibayama | H01C 1/028 |
| | | | 374/E7.028 |
| 2010/0052842 A1 * | 3/2010 | Kato | H01C 7/008 |
| | | | 338/22 R |
| 2021/0148766 A1 * | 5/2021 | Takase | G01K 1/16 |
| 2022/0049993 A1 * | 2/2022 | Kleine-Hollenhorst | |
| | | | G01K 1/14 |
| 2024/0055812 A1 * | 2/2024 | Dong | G01K 1/12 |

* cited by examiner

TEMPERATURE SENSOR AND CONNECTOR ASSEMBLY

CROSS-REFERENCE TO RELATED APPLICATION

This application claims the benefit of Chinese Patent Application No. CN 202211114646.3 filed on Sep. 14, 2022, in the State Intellectual Property Office of China, the whole disclosure of which is incorporated herein by reference.

FIELD OF THE INVENTION

Embodiments of the present invention relate to a temperature sensor and a connector assembly including the temperature sensor.

BACKGROUND

In the prior art, with the rapid development of the energy industry, and in particular, battery energy storage systems, demand for high current connectors in energy storage applications is increasing. The most critical unit energy storage cabinet in an energy storage system is usually composed of multiple independent battery boxes connected in series through high current connectors. This requires strict control of the temperature of each battery box and the temperature of the high current connectors connected to multiple battery boxes, for example, below 45 degrees Celsius.

At present, the development of energy storage battery systems is not yet mature enough. Due to high temperatures, accidents resulting from fire and combustion often occur. As the most important component connecting energy storage battery boxes, high current connectors play an important role. The current high current connectors used in energy storage systems have the following shortcomings. The high current connectors in energy storage applications usually do not have temperature sensors, and thus cannot monitor the temperature of the high current connectors connected to the battery box in real-time. In other application fields, there are plans to add temperature sensors to electrical connectors, but additional parts such as brackets, spring clips, and locks are needed to fix and install the temperature sensor. This leads to a complex structure for fixing and installing the temperature sensor, low fixation reliability, and high cost.

In addition, in the prior art, temperature sensors are susceptible to thermal effects from components other than the detected conductive terminal, resulting in significant errors between the temperature detected by the temperature sensor and the actual temperature of the conductive terminal, reducing the accuracy of temperature detection.

Improved temperature sensors and associated connector assemblies are desired.

SUMMARY

According to an embodiment of the present disclosure, a connector assembly comprises a connector and a temperature sensor. The connector includes a connector housing formed with a sensor slot, and a conductive terminal arranged in the connector housing. The temperature sensor is inserted into the sensor slot and is adapted to detect a temperature of the conductive terminal in the connector. The sensor includes a shell having a first sidewall in thermal contact with the conductive terminal, and a second sidewall opposite to the first sidewall. The second sidewall defines an interference fit portion extending from an outer surface thereof. The interference fit portion forms an interference fit with an inner wall of the sensor slot. A remaining portion of the second sidewall except for the interference fit portion is separated from the inner wall of the sensor slot by a predetermined gap. The sensor further includes a temperature sensing element arranged in the shell.

BRIEF DESCRIPTION OF THE DRAWINGS

The invention will now be described by way of example with reference to the accompanying Figures, of which.

DETAILED DESCRIPTION OF THE EMBODIMENTS

Figure 1:
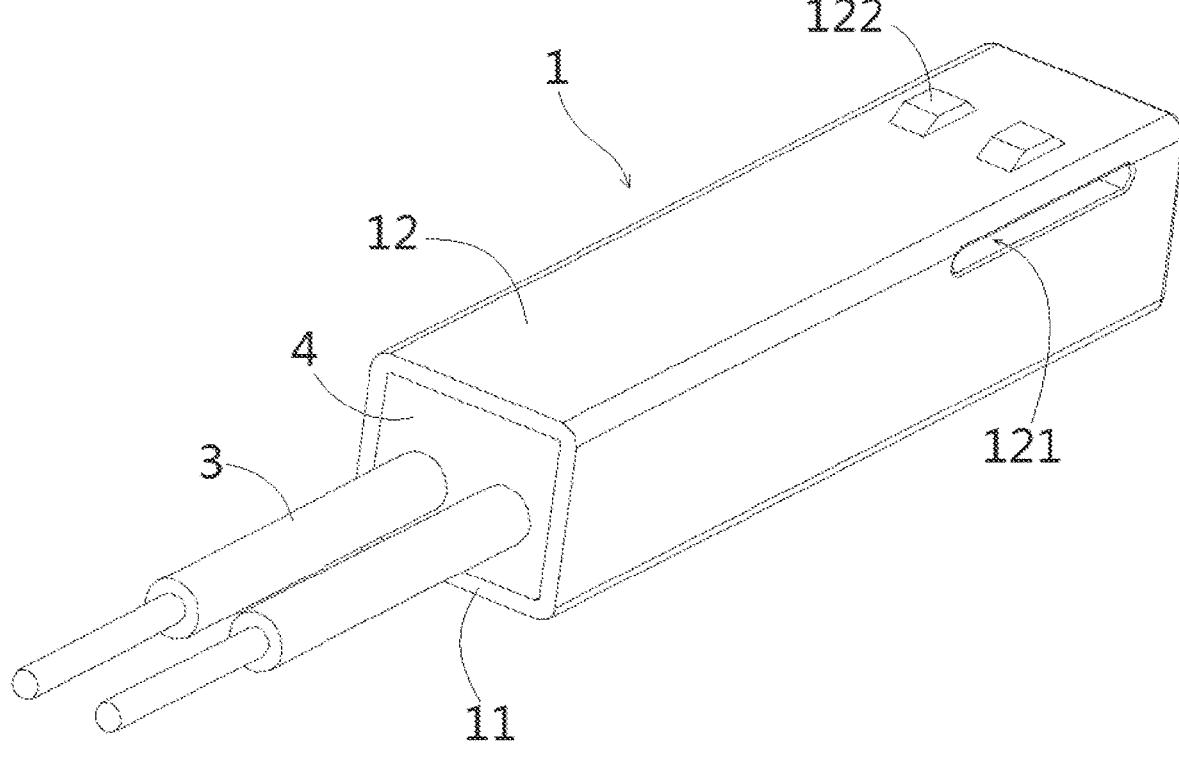
FIG. 1 shows an illustrative perspective view of a temperature sensor according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a temperature sensor adapted to be inserted into a sensor slot on a connector housing for detecting the temperature of a conductive terminal in the connector is provided. The temperature sensor comprises a shell which includes a first sidewall for thermal contact with the conductive terminal and a second sidewall opposite to the first sidewall, and a temperature sensing element which is arranged in the shell. The second sidewall has an interference fit portion for interference fit with an inner wall of the sensor slot. The interference fit portion protrudes from the outer surface of the second sidewall. When the temperature sensor is inserted into the sensor slot, a remaining portion or part of the second sidewall except for the interference fit portion is separated from the inner wall of the sensor slot by a predetermined gap.

According to another embodiment of the present disclosure, a connector assembly is provided. The connector assembly comprises a connector and the above-described temperature sensor. The connector includes a connector housing formed with a sensor slot, and a conductive terminal arranged in the connector housing. The temperature sensor is inserted into the sensor slot for detecting the temperature of the conductive terminal. The first sidewall of the shell of the temperature sensor is in thermal contact with the conductive terminal, and the second sidewall of the shell of the temperature sensor has an interference fit portion that interferes with the inner wall of the sensor slot. The interference fit portion protrudes from the outer surface of the second sidewall, so that a remaining part of the second sidewall except for the interference fit portion is separated from the inner wall of the sensor slot by a predetermined gap.

Figure 2:
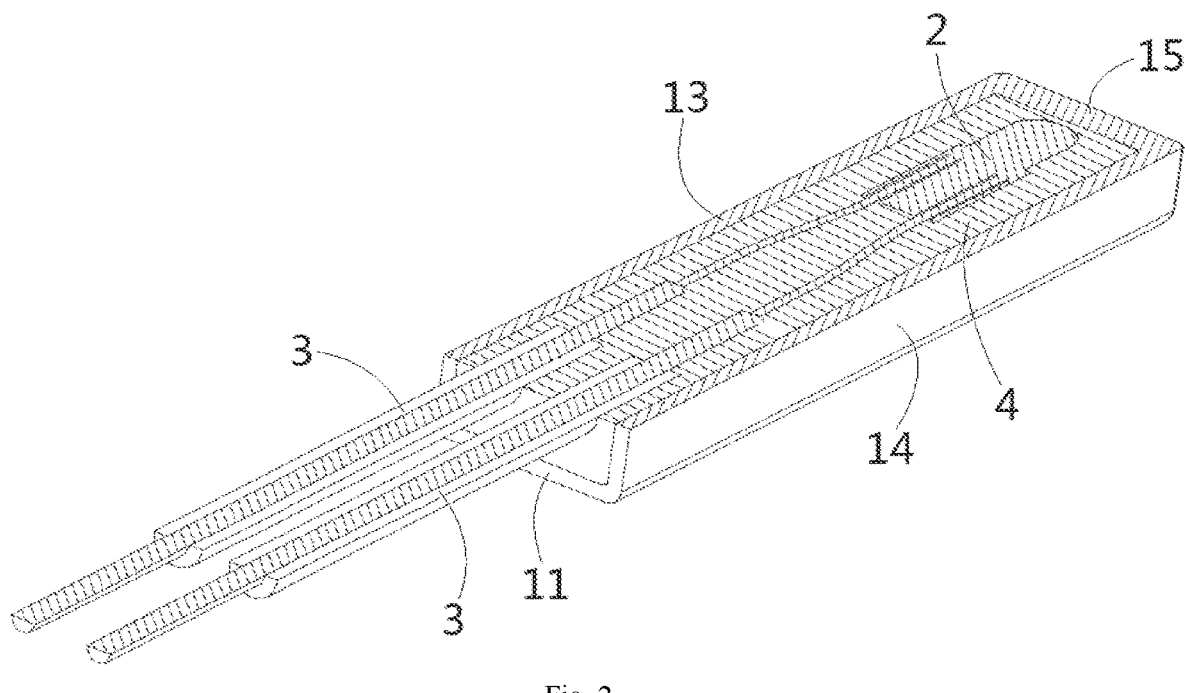
FIG. 2 shows a longitudinal cross-sectional view of a temperature sensor along a horizontal plane according to an exemplary embodiment of the present invention.
Figure 3:
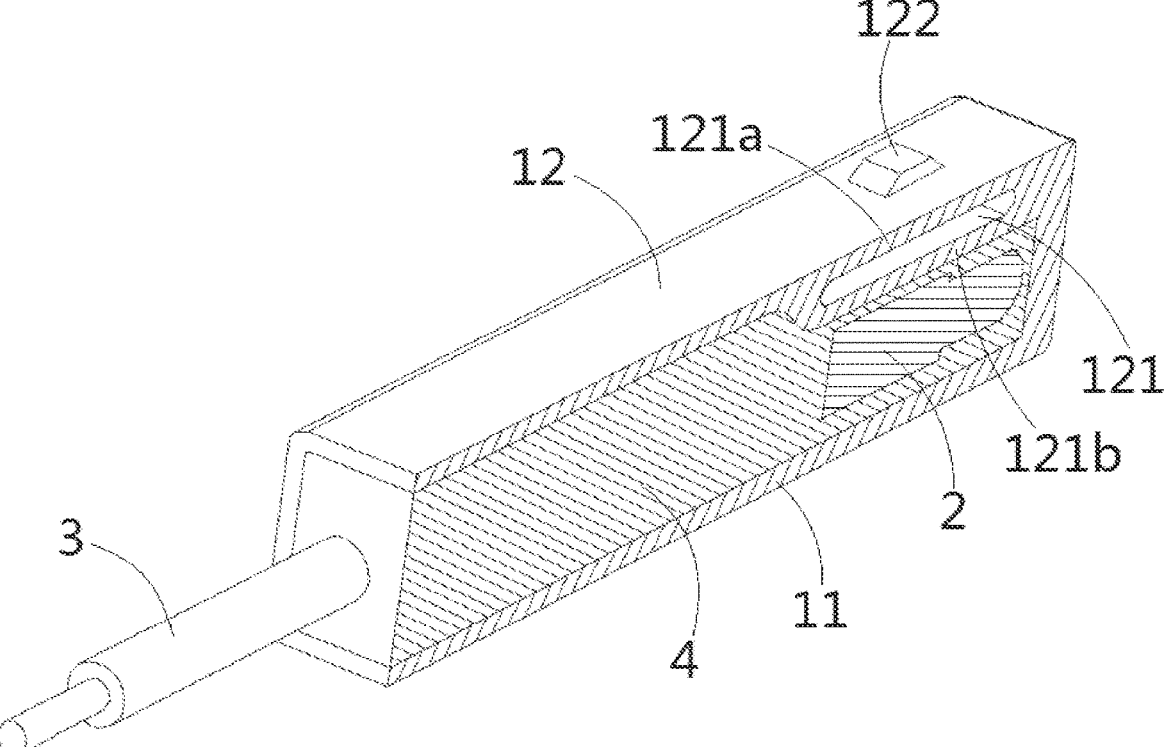
FIG. 3 shows a longitudinal cross-sectional view along a vertical plane of a temperature sensor according to an exemplary embodiment of the present invention.
Figure 4:
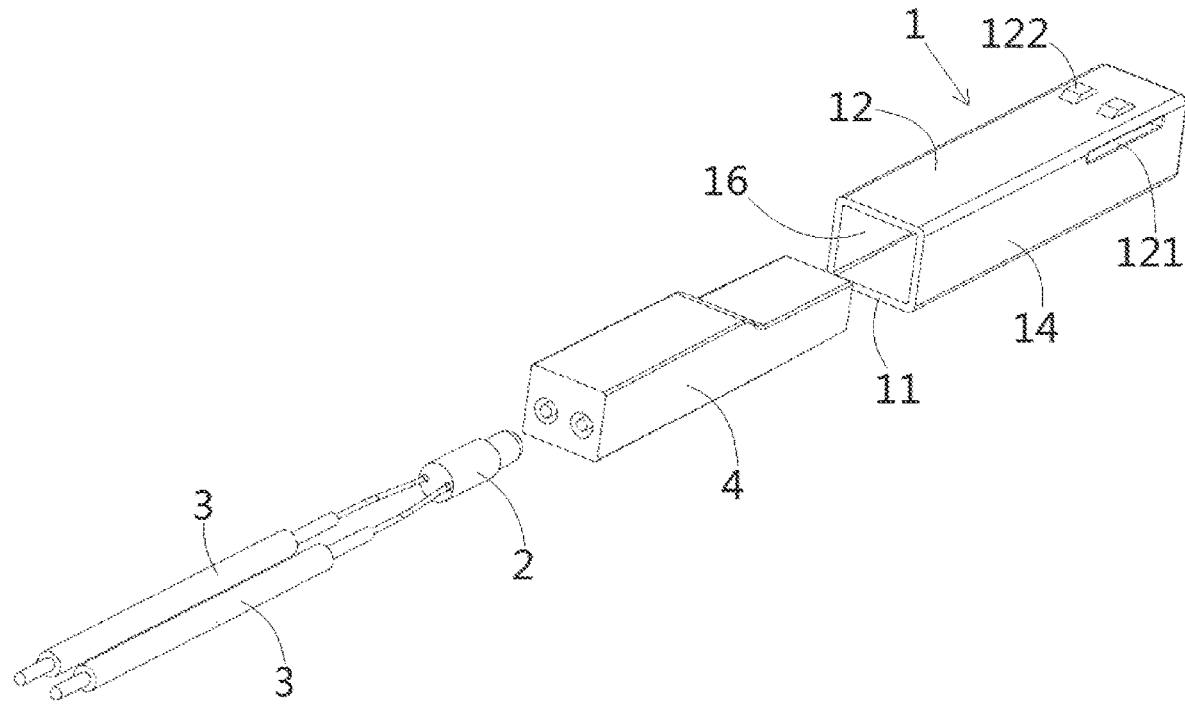
FIG. 4 shows an illustrative exploded view of a temperature sensor according to an exemplary embodiment of the present invention.
Figure 5:
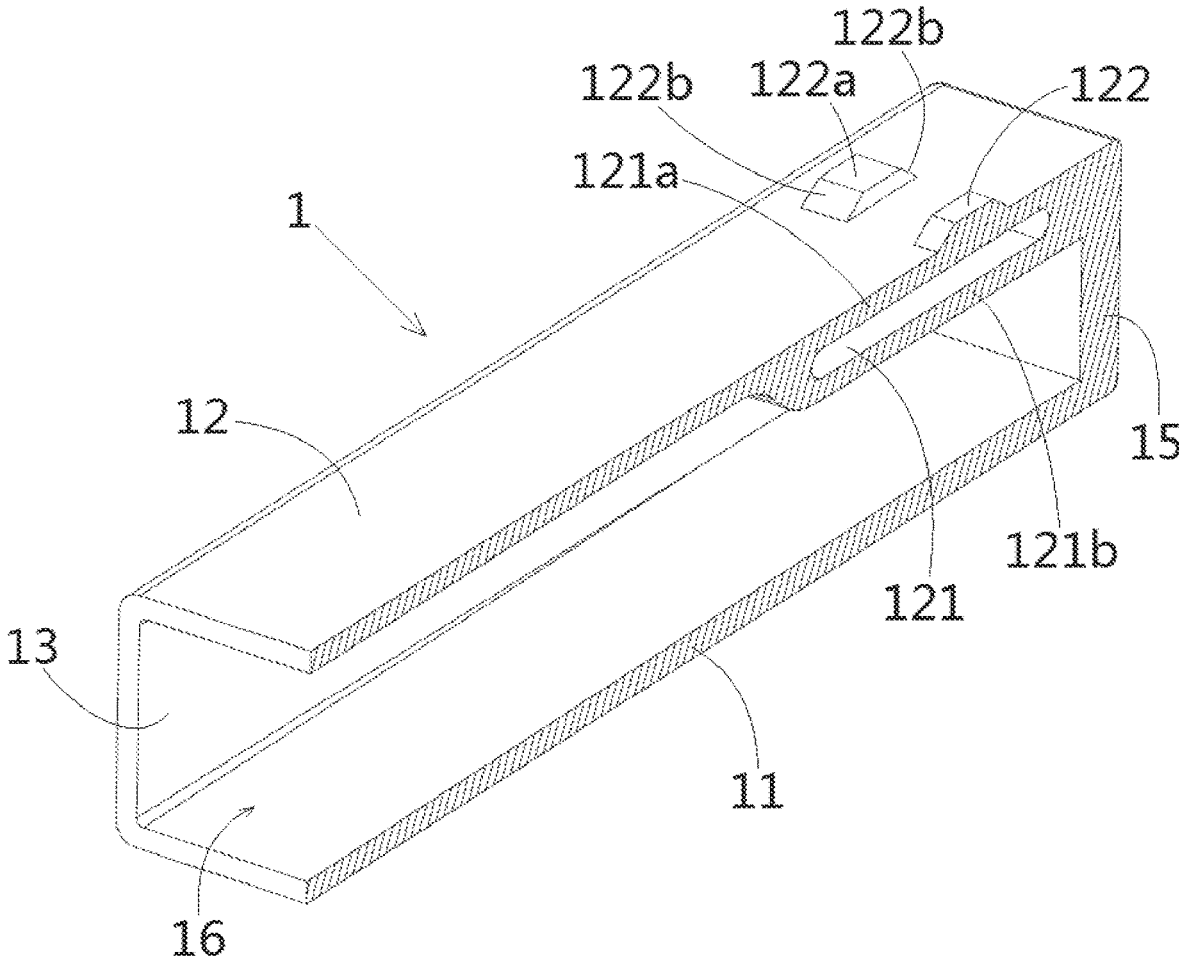
FIG. 5 shows a longitudinal cross-sectional view of a shell of a temperature sensor according to an exemplary embodiment of the present invention.
Figure 6:
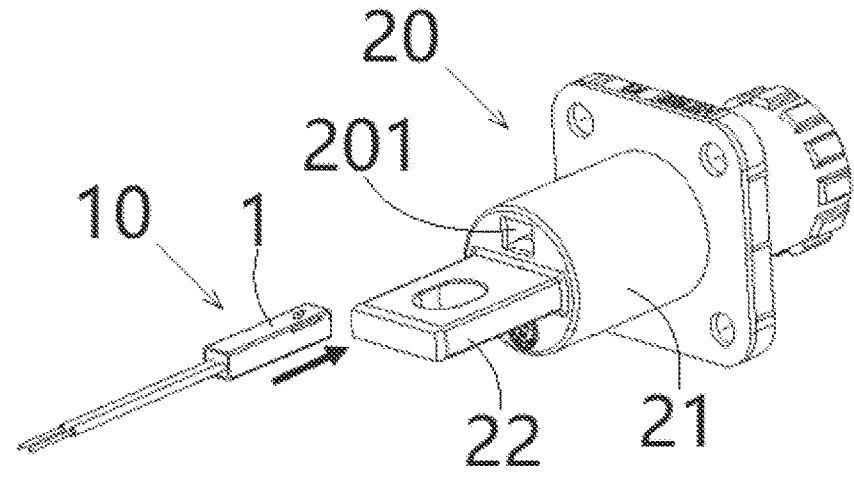
FIG. 6 shows an illustrative view of an operation of inserting the temperature sensor shown in FIG. 1 into a sensor slot of a connector according to an embodiment of the present invention.
Figure 7:
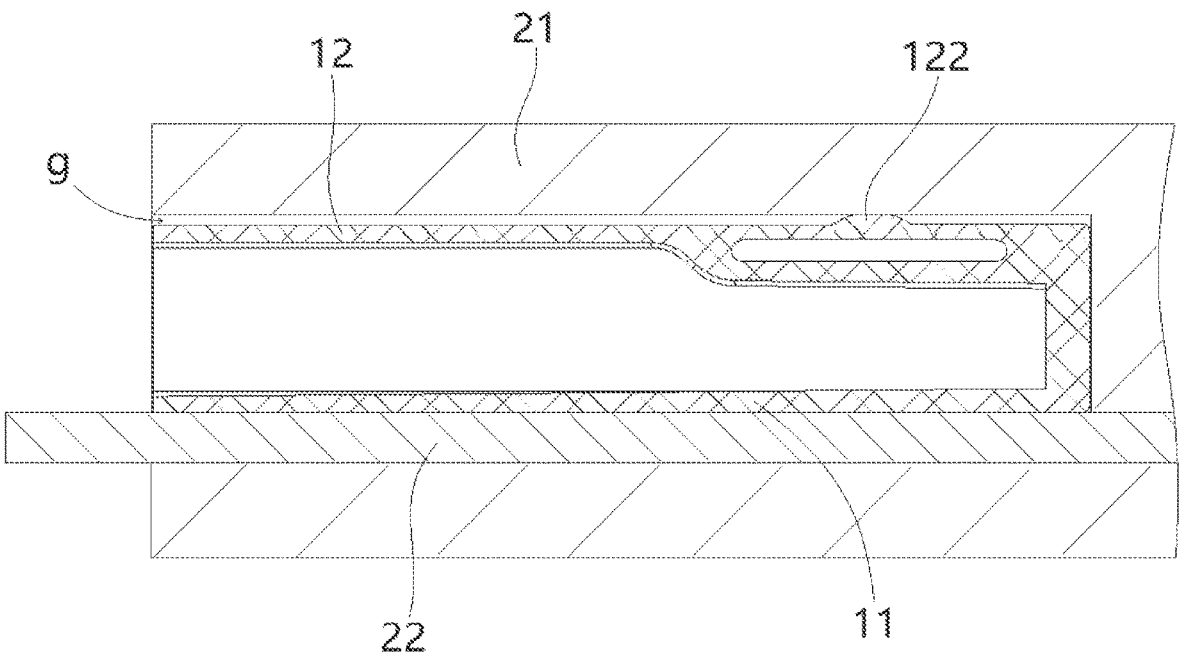
FIG. 7 shows a longitudinal cross-sectional view of a connector assembly with a temperature sensor inserted according to an exemplary embodiment of the present invention.

FIG. 1 shows an illustrative perspective view of a temperature sensor according to an exemplary embodiment of the present invention. FIG. 2 shows a longitudinal cross-sectional view of a temperature sensor along a horizontal plane according to an exemplary embodiment of the present invention. FIG. 3 shows a longitudinal cross-sectional view along a vertical plane of a temperature sensor according to an exemplary embodiment of the present invention. FIG. 4 shows an illustrative view of the decomposition of a temperature sensor according to an exemplary embodiment of the present invention. FIG. 5 shows a longitudinal cross-sectional view of the shell 1 of a temperature sensor according to an exemplary embodiment of the present invention. FIG. 6 shows an illustrative view of inserting the temperature sensor 10 shown in FIG. 1 into the sensor slot 201 of connector 20. FIG. 7 shows a longitudinal cross-sectional view of a connector assembly with a temperature sensor 10 inserted according to an exemplary embodiment of the present invention. As shown in FIGS. 1-7, in an exemplary embodiment of the present invention, a temperature sensor 10 is disclosed. The temperature sensor 10 is suitable for insertion into the sensor slot 201 on the connector housing 21, and is adapted to detect a temperature of the conductive terminal 22 in the connector 20.

The temperature sensor 10 comprises a shell 1 and a temperature sensing element 2. The shell 1 includes a first sidewall 11 for thermal contact with the conductive terminal 22 and a second sidewall 12 opposite the first sidewall 11. The temperature sensing element 2 is arranged in the shell 1. The second sidewall 12 of the shell 1 has an interference fit portion adapted to form an interference fit with the inner wall of the sensor slot 201. The interference fit portion protrudes from the outer surface of the second sidewall 12, so that there is a predetermined gap g between a remaining portion of the second sidewall 12, except for the interference fit portion and the inner wall of the sensor slot 201 when the temperature sensor 10 is inserted into the sensor slot 201. See FIG. 7. This arrangement reduces any thermal impact of other components except for the conductive terminal 22 on the temperature sensor, thereby improving the accuracy of temperature detection of the temperature sensor.

It should be understood that the present disclosure is not limited to the illustrated embodiments. For example, in another exemplary embodiment of the present invention, any one of the other sidewalls 12, 13, 14, and 15 of the shell 1 except for the first sidewall 11 may have an interference fit portion adapted to form an interference fit with the inner wall of the sensor slot 201, so that a remaining part of any one of the other sidewalls 12, 13, 14, and 15 except for the interference fit portion is separated from the inner wall of the sensor slot 201 by a predetermined gap g. This can minimize the thermal impact of other components except for the conductive terminal 22 on the temperature sensor, thereby further improving the accuracy of temperature detection of the temperature sensor.

In the illustrated embodiments, a slot hole 121 is formed in the second sidewall 12 of the shell 1, which separates a portion of the second sidewall 12 into an outer wall portion 121a and an inner wall portion 121b. The interference fit portion includes a convex portion 122 formed on the outer surface of the outer wall portion 121a of the slot hole 121. The convex portion 122 forms an interference fit with the inner wall of sensor slot 201. The outer wall portion 121a of slot hole 121 undergoes elastic deformation towards the interior of slot hole 121 when the convex portion 122 interferes with the inner wall of sensor slot 201, resulting in a predetermined contact pressure between the first sidewall 11 of shell 1 and the conductive terminal 22 to ensure reliable thermal contact between the first sidewall 11 and the conductive terminal 22. In the exemplary embodiments, one slot hole 121 is formed in the second sidewall 12 of the shell 1, and two convex portions 122 are formed on the outer surface of the outer wall portion 121a of the slot hole 121. The two convex portions 122 are arranged side by side and spaced apart from each other in the transverse direction of the shell 1.

Figure 8:
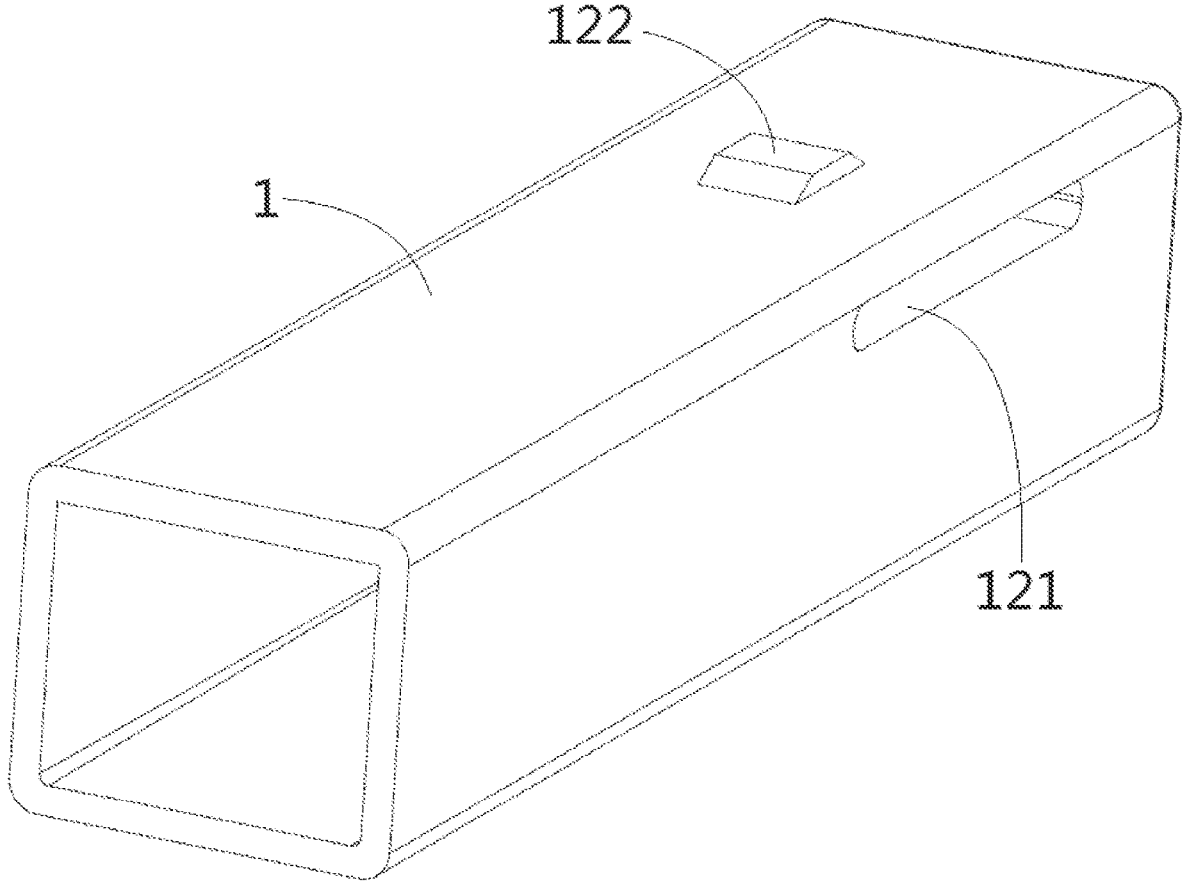
FIG. 8 shows an illustrative perspective view of a shell of a temperature sensor according to another exemplary embodiment of the present invention.
Figure 9:
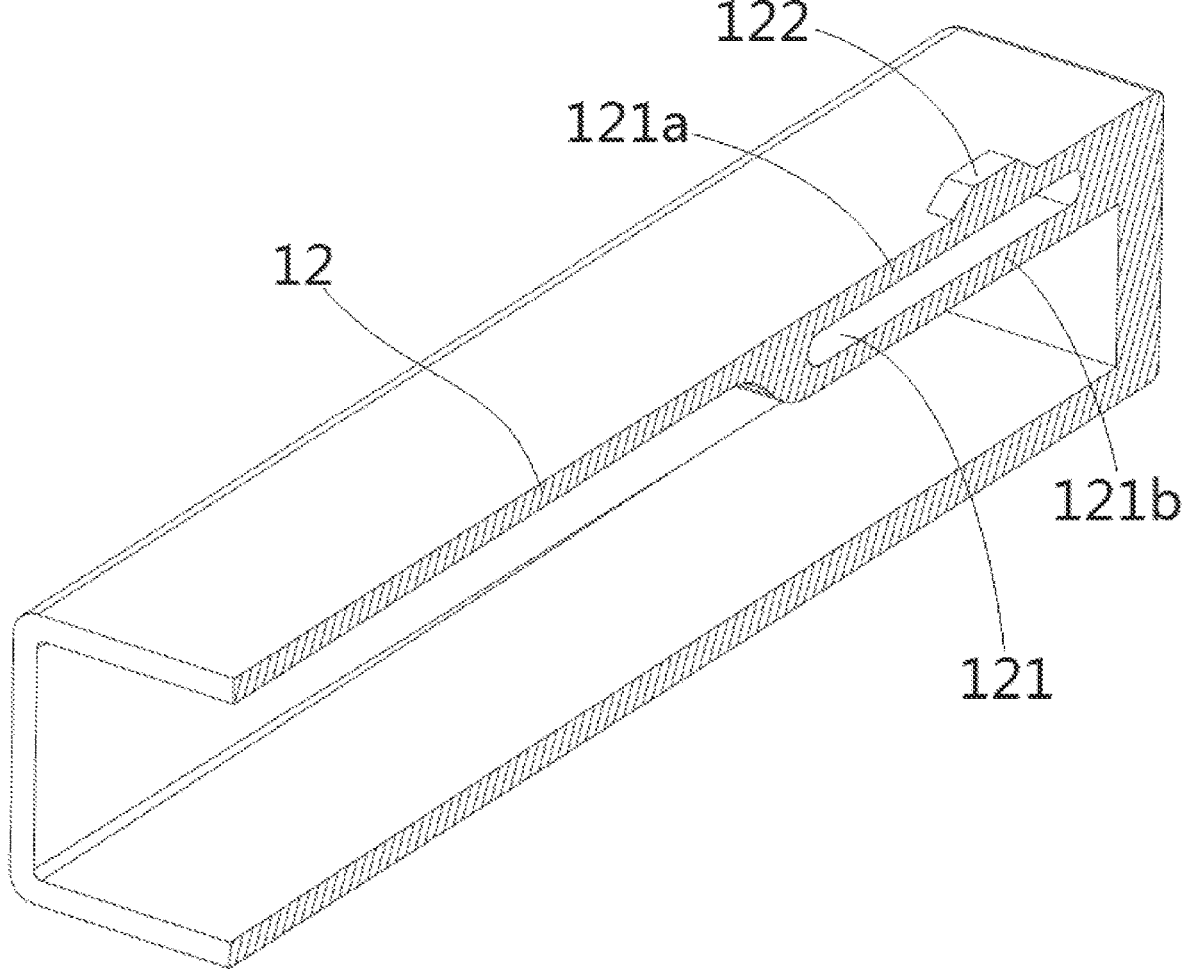
FIG. 9 shows a longitudinal cross-sectional view of a shell of a temperature sensor according to another exemplary embodiment of the present invention.

FIG. 8 shows an illustrative perspective view of the shell 1 of the temperature sensor according to another exemplary embodiment of the present invention. FIG. 9 shows a longitudinal cross-sectional view of the shell 1 of the temperature sensor according to another exemplary embodiment of the present invention. As shown in FIGS. 8 and 9, in the illustrated embodiment, one slot hole 121 is formed in the second sidewall 12 of the shell 1, and one convex portion 122 is formed on the outer surface of the outer wall portion 121a of the slot hole 121.

Figure 10:
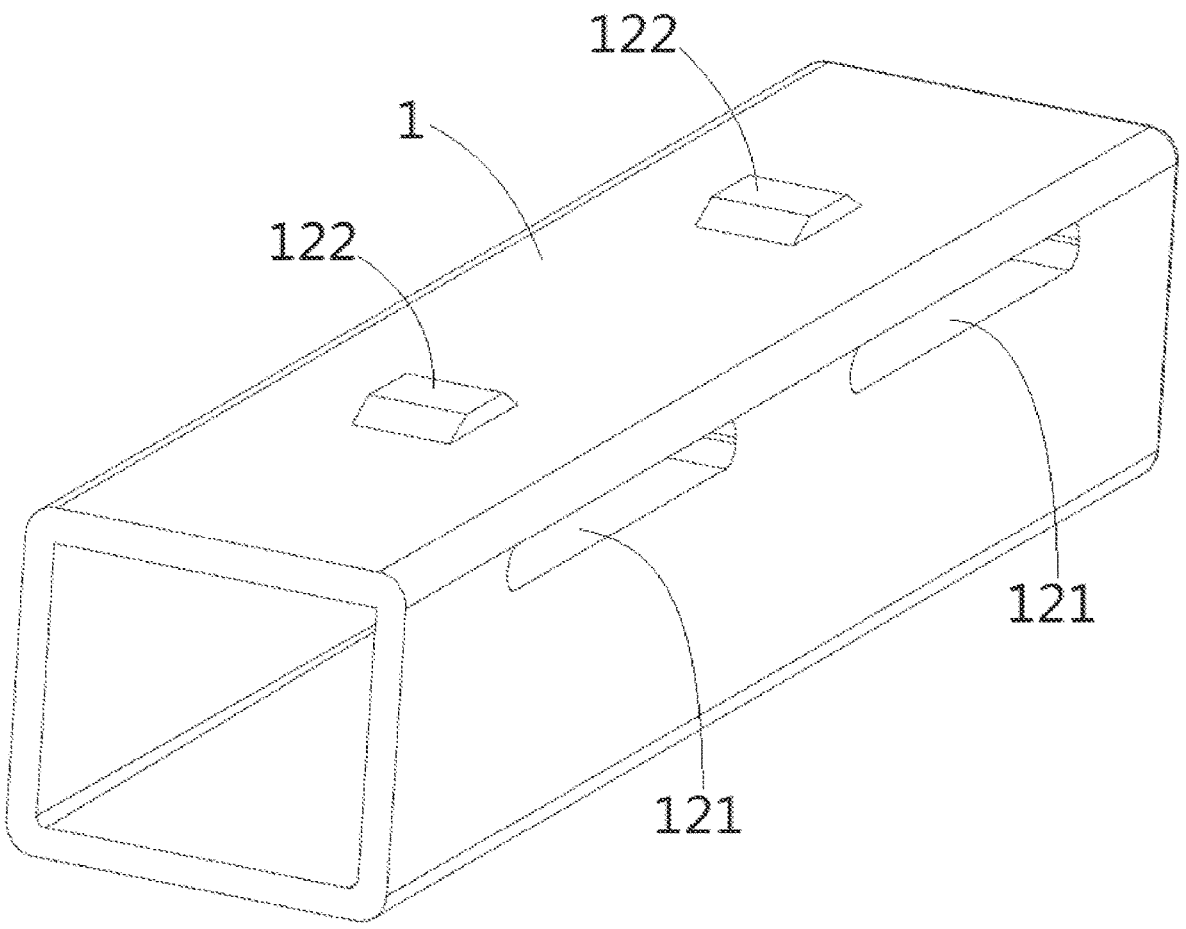
FIG. 10 shows an illustrative perspective view of a shell of a temperature sensor according to another exemplary embodiment of the present invention.
Figure 11:
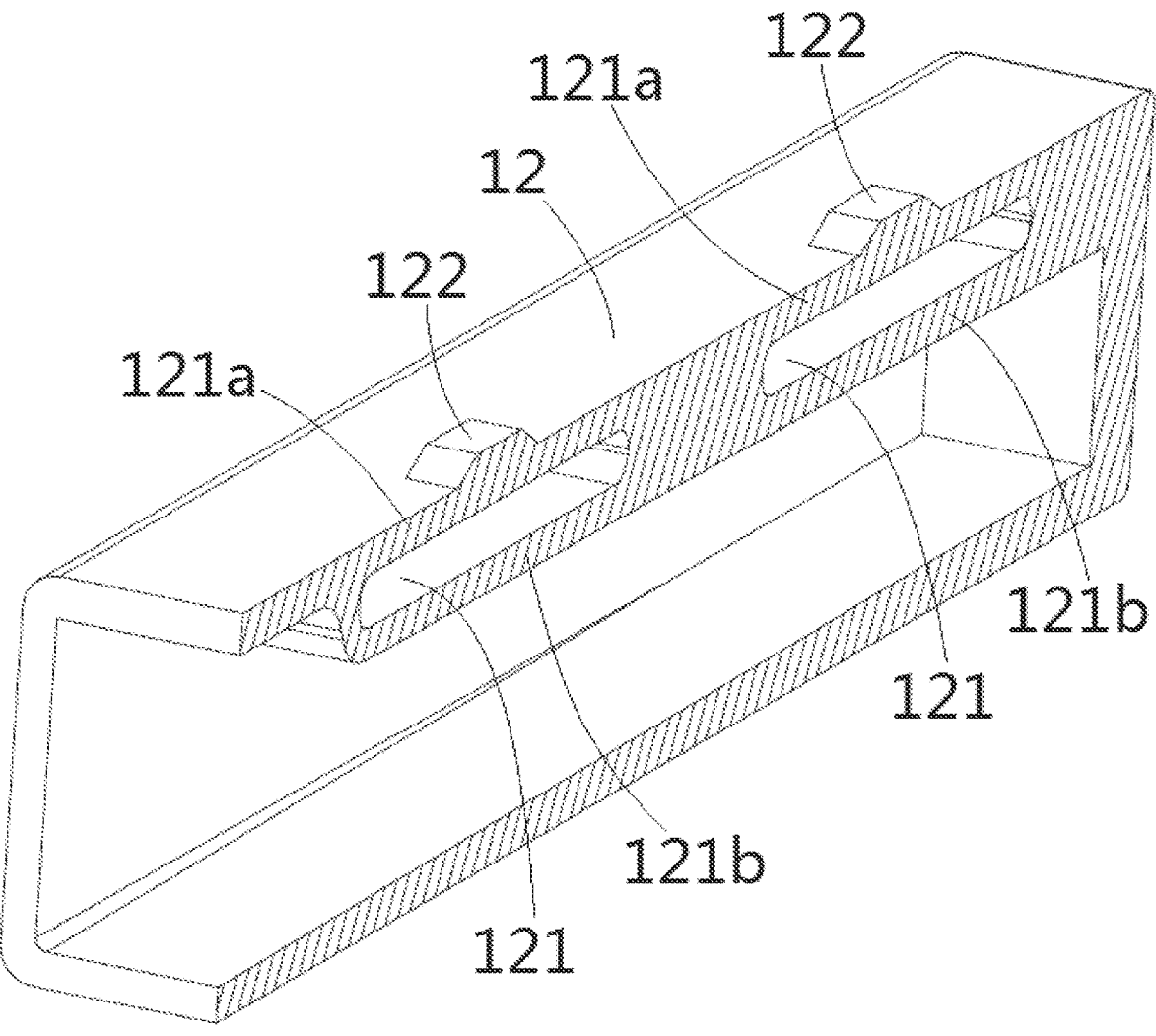
FIG. 11 shows a longitudinal cross-sectional view of a shell of a temperature sensor according to another exemplary embodiment of the present invention.
Figure 12:
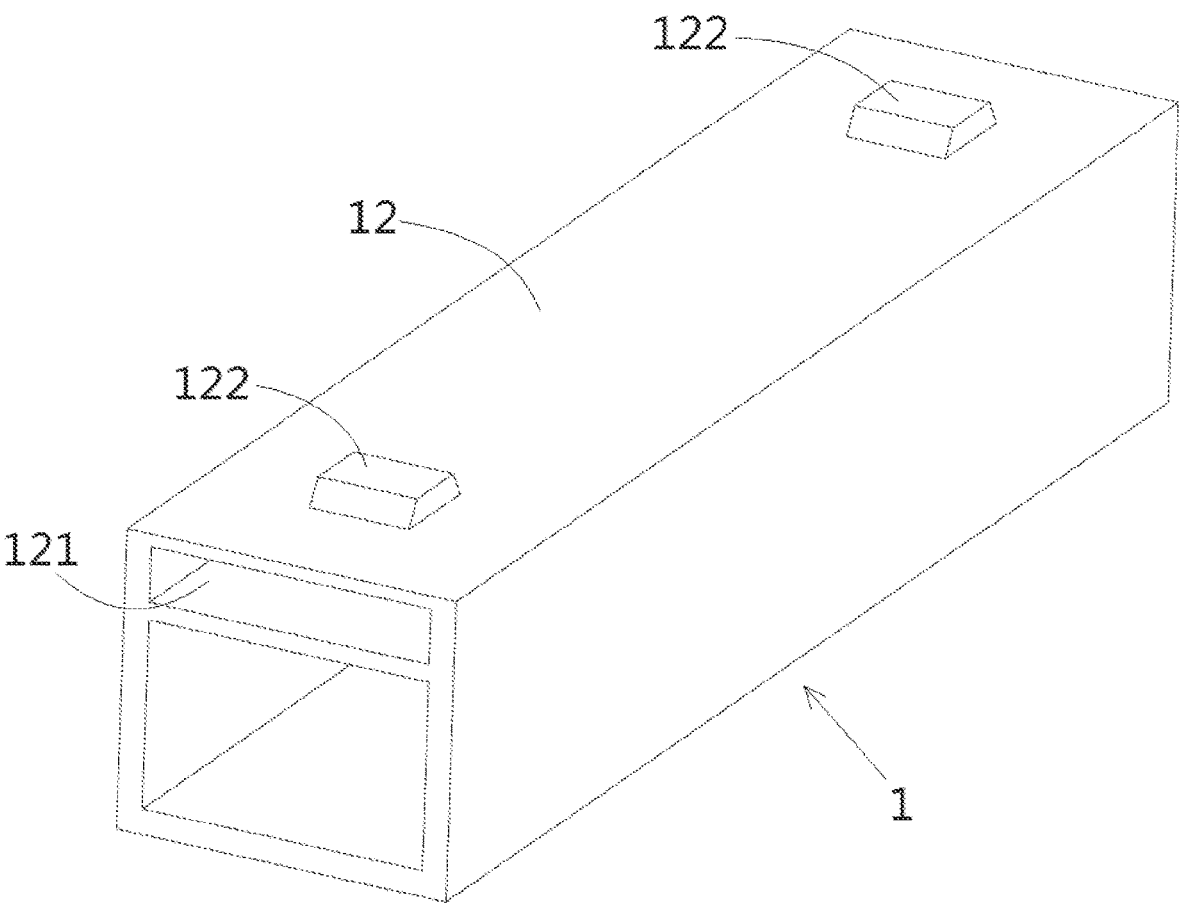
FIG. 12 shows an illustrative perspective view of a shell of a temperature sensor according to another exemplary embodiment of the present invention.
Figure 13:
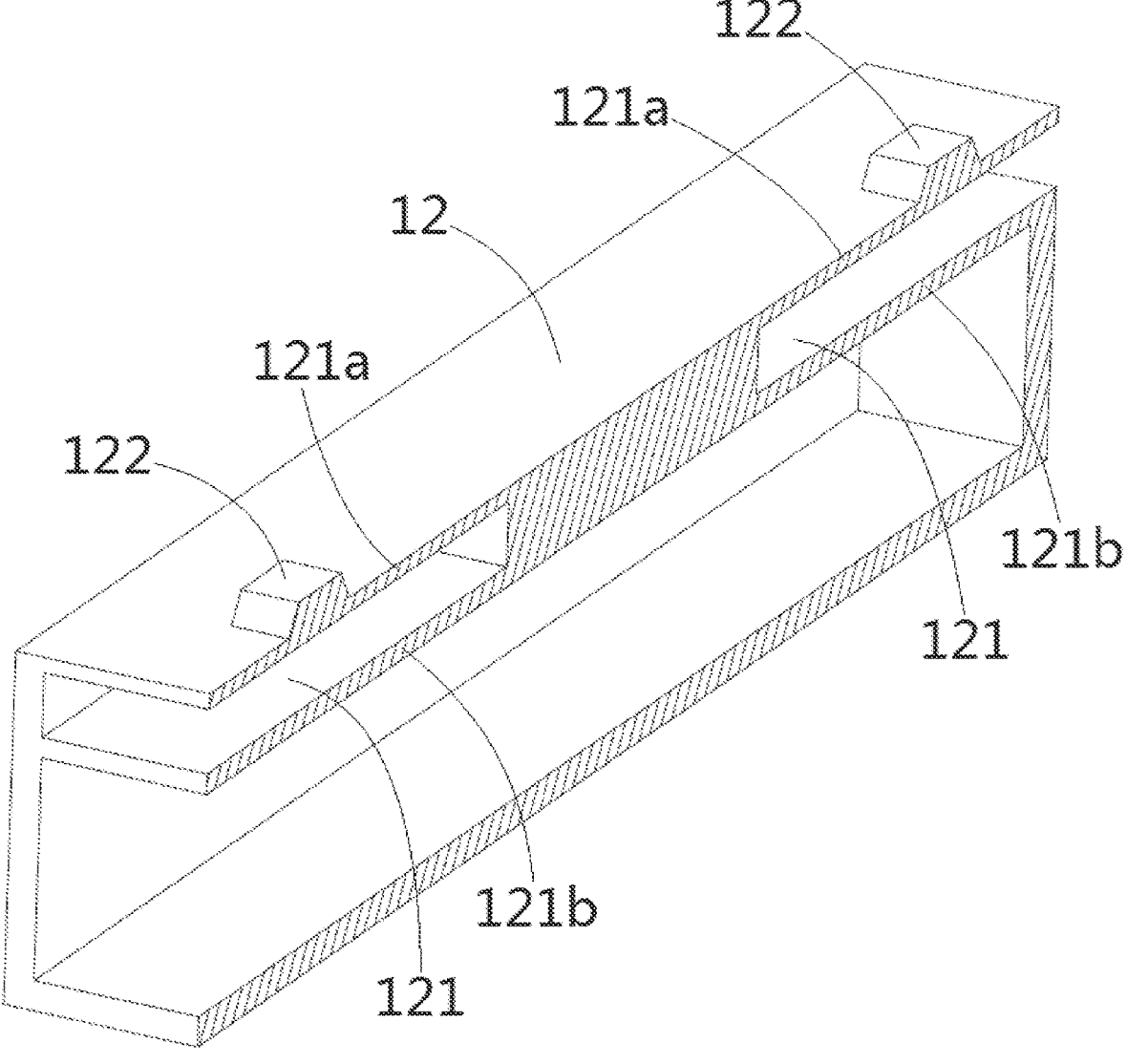
FIG. 13 shows a longitudinal cross-sectional view of a shell of a temperature sensor according to another exemplary embodiment of the present invention.

FIG. 10 shows an illustrative perspective view of the shell 1 of the temperature sensor according to another exemplary embodiment of the present invention. FIG. 11 shows a longitudinal cross-sectional view of the shell 1 of the temperature sensor according to another exemplary embodiment of the present invention. FIG. 12 shows an illustrative perspective view of the shell 1 of the temperature sensor according to another exemplary embodiment of the present invention. FIG. 13 shows a longitudinal cross-sectional view of the shell 1 of a temperature sensor according to another exemplary embodiment of the present invention. As shown in FIGS. 10-13, in the illustrated embodiments, multiple slot holes 121 are formed in the second sidewall 12 of the shell 1, and one convex portion 122 is formed on the outer surface of the outer wall portion 121*a* of each slot hole 121. Multiple slot holes 121 on the second sidewall 12 of the shell 1 are arranged in a row in a longitudinal direction of the shell 1 and spaced apart from each other.

The present disclosure is not limited to the illustrated embodiments. For example, in another exemplary embodiment of the present invention, multiple slot holes 121 are formed in the second sidewall 12 of the shell 1, and multiple convex portions 122 are formed on the outer surface of the outer wall portion 121*a* of each slot hole 121. Multiple slot holes 121 on the second sidewall 12 of the shell 1 are arranged in a row in the longitudinal direction of the shell 1 and spaced apart from each other. Multiple convex portions 122 on the outer surface of the outer wall portion 121*a* of each slot hole 121 are arranged in a row in the transverse direction of the shell 1 and spaced apart from each other.

Referring generally to FIGS. 1-13, in the illustrated embodiments, the second sidewall 12 has a flat outer surface, the convex portion 122 has a flat top surface 122*a*, and a linear or smooth transition surface 122*b* extending from the top surface 122*a* to the outer surface of the second sidewall 12. The transition surface 122*b* is used to guide shell 1 into and out of the sensor slot 201. In an exemplary embodiment of the present invention, the smooth transition surface 122*b* may be an arc-shaped or a linear inclined surface.

Figure 14:
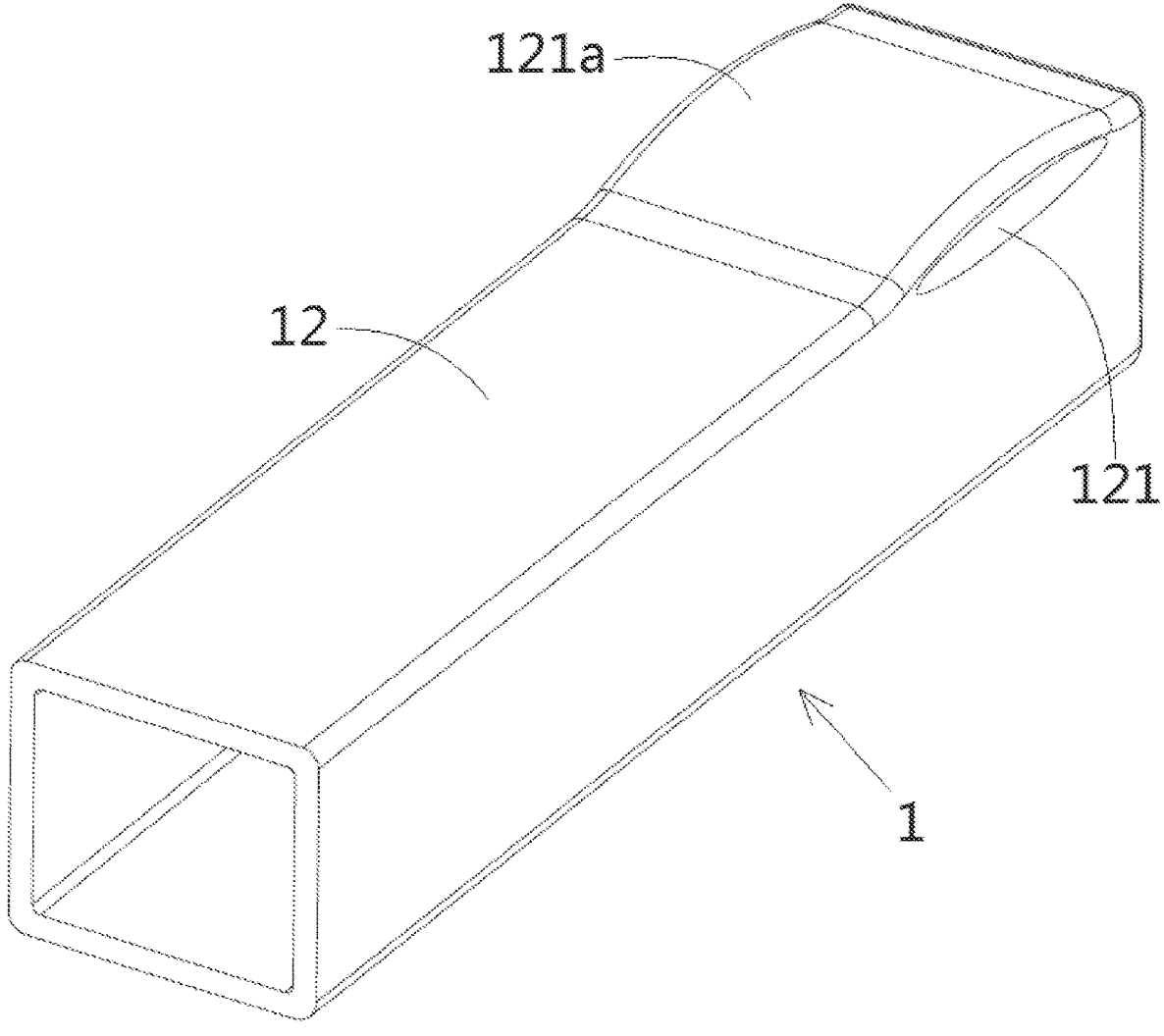
FIG. 14 shows an illustrative perspective view of a shell of a temperature sensor according to another exemplary embodiment of the present invention.
Figure 15:
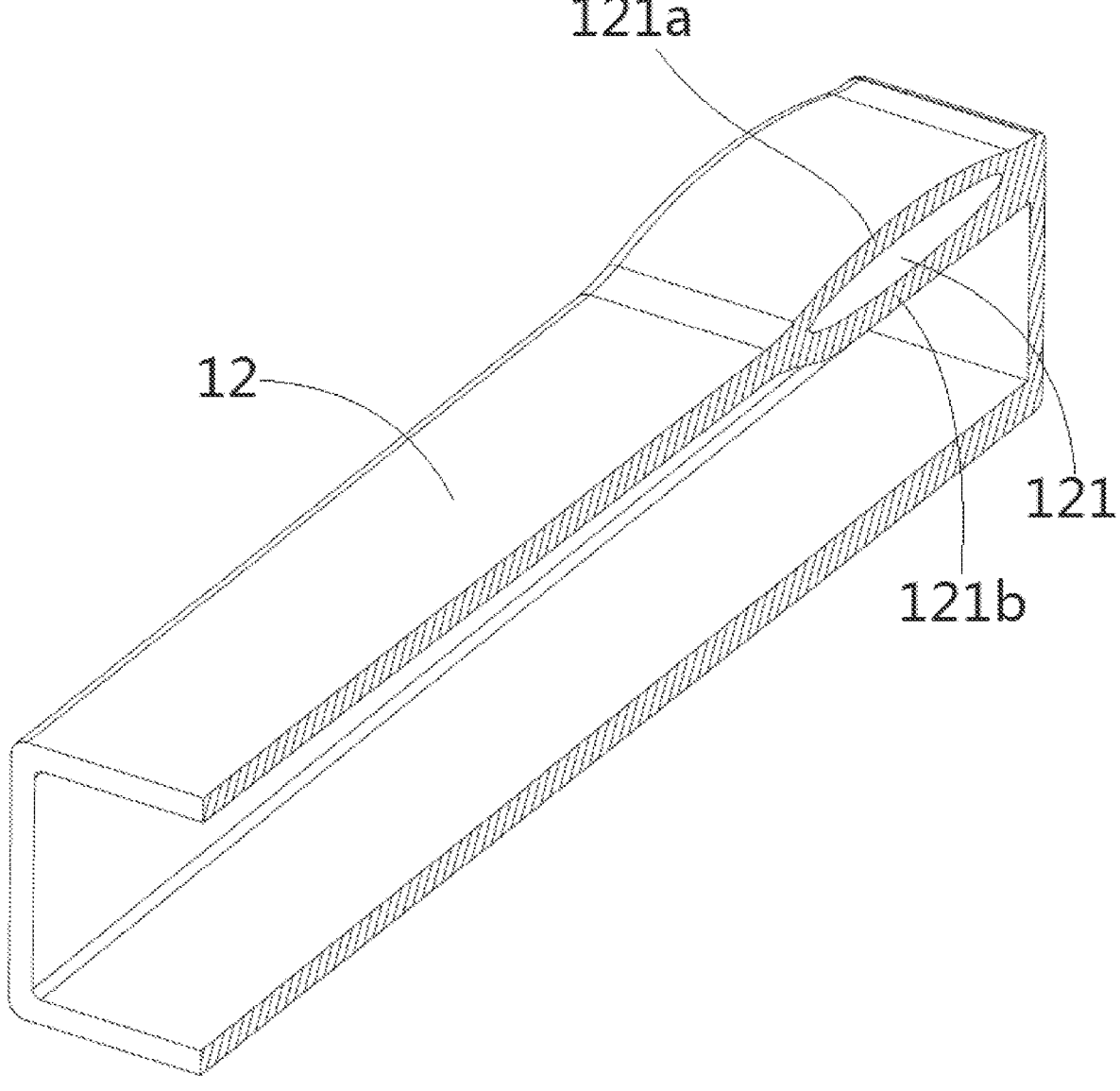
FIG. 15 shows a longitudinal cross-sectional view of a shell of a temperature sensor according to another exemplary embodiment of the present invention.

FIG. 14 shows an illustrative perspective view of the shell 1 of the temperature sensor according to another exemplary embodiment of the present invention. FIG. 15 shows a longitudinal cross-sectional view of the shell 1 of a temperature sensor according to another exemplary embodiment of the present invention. As shown in FIGS. 14 and 15, in the illustrated embodiment, a slot hole 121 is formed in the second sidewall 12 of the shell 1, which separates a portion of the second sidewall 12 into an outer wall portion 121*a* and an inner wall portion 121*b*. The outer wall portion 121*a* of slot hole 121 is arched outward to form an interference fit portion that interferes with the inner wall of sensor slot 201. In the illustrated embodiment, the outer wall portion 121*a* of slot hole 121 undergoes elastic deformation towards the interior of slot hole 121 when it interferes with the inner wall of sensor slot 201, ensuring a predetermined contact pressure between the temperature sensor and the conductive terminal 22, thereby ensuring reliable thermal contact between the first sidewall 11 and the conductive terminal 22. In the illustrated embodiment, the cross-section of slot hole 121 is elliptical.

With reference to FIGS. 1-15, in the illustrated embodiments, the thickness of the portion of the second sidewall 12 formed with the slot hole 121 is greater than the thickness of the rest part of the second sidewall 12 except for the portion formed with the slot hole 121.

As shown in FIGS. 1-13, in the illustrated embodiments, the slot hole 121 runs through the second sidewall 12 along the transvers direction of the shell 1, so that the slot hole 121 is a transverse through hole formed in the second sidewall

12. However, the present invention is not limited to the illustrated embodiments. For example, the slot hole 121 may not run through the second sidewall 12 along the transverse direction of the shell 1, so that the slot hole 121 is a transverse blind hole formed in the second sidewall 12.

Referring again to FIGS. 14 and 15, in the illustrated embodiment, the slot hole 121 does not run through the second sidewall 12 along the longitudinal direction of the shell 1, so that the slot hole 121 is a longitudinal blind hole formed in the second sidewall 12. However, the present invention is not limited to the illustrated embodiments, for example, the slot hole 121 can run through the second sidewall 12 along the longitudinal direction of the shell 1. In this way, the slot hole 121 is a longitudinal through hole formed in the second sidewall 12.

As shown in FIGS. 1-15, in the illustrated embodiment, the shell 1 includes a left wall 13 and a right wall 14 that are opposite in its transverse direction, as well as a top wall and a bottom wall that are opposite in its height direction. The first sidewall 11 is the bottom wall of shell 1, and the second sidewall 12 is the top wall of shell 1. The shell 1 further includes a front end wall 15 and a rear port 16 opposite the front end wall 15. The temperature sensing element 2 is arranged in the shell 1 through the rear port 16.

In the illustrated embodiment, the temperature sensor further includes a wire 3 and a thermal conductive sealant 4. The wire 3 extends into the shell 1 through the rear port 16 and is electrically connected to the temperature sensing element 2. The thermal conductive sealant 4 is poured into the shell 1 through the rear port 16.

In another exemplary embodiment of the present invention, a connector assembly is also disclosed. The connector assembly includes a connector 20 and the above-described temperature sensor 10. The connector 20 includes a connector housing 21 and a conductive terminal 22. The connector housing 21 is formed with a sensor slot 201. The conductive terminal 22 is arranged in the connector housing 21. The temperature sensor 10 is inserted into the sensor slot 201 to detect the temperature of the conductive terminal 22. The first sidewall 11 of the shell 1 of the temperature sensor 10 is in thermal contact with the conductive terminal 22. The second sidewall 12 of the shell 1 of the temperature sensor has an interference fit portion that interferes with the inner wall of the sensor slot 201. The interference fit portion protrudes from the outer surface of the second sidewall 12, so that the remaining portion or part of the second sidewall 12 except for the interference fit portion is separated from the inner wall of the sensor slot 201 with a predetermined gap g.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A temperature sensor adapted to be inserted into a sensor slot of a connector housing and to detect a temperature of a conductive terminal in the connector housing, comprising:
a shell, including:
a first sidewall adapted to thermally contact the conductive terminal; and
a second sidewall opposite to the first sidewall and including an interference fit portion extending from an outer surface thereof, the interference fit portion adapted to form an interference fit with an inner wall of the sensor slot, wherein, when the temperature sensor is inserted into the sensor slot, a remaining portion of the second sidewall except for the interference fit portion is separated from the inner wall of the sensor slot by a predetermined gap; and
a temperature sensing element arranged in the shell.

2. The temperature sensor according to claim 1, wherein any one of a remainder of sidewalls of the shell except for the first sidewall has an interference fit portion adapted to form an interference fit with the inner wall of the sensor slot, such that a remaining portion of any one of the remaining sidewalls except for the interference fit portion is separated from the inner wall of the sensor slot by a predetermined gap.

3. The temperature sensor according to claim 1, wherein:
a slot hole is formed in the second sidewall of the shell and separates a portion of the second sidewall into an outer wall portion and an inner wall portion, the interference fit portion includes a convex portion formed on the outer surface of the outer wall portion of the slot hole; and
the outer wall portion of the slot hole is adapted to elastically deform towards the interior of the slot hole when the convex portion interferes with the inner wall of the sensor slot, resulting in a predetermined contact pressure between the first sidewall of the shell and the conductive terminal to ensure reliable thermal contact between the first sidewall and the conductive terminal.

4. The temperature sensor according to claim 3, wherein one slot hole is formed in the second sidewall of the shell, and one convex portion is formed on the outer surface of the outer wall portion of the slot hole.

5. The temperature sensor according to claim 3, wherein one slot hole is formed in the second sidewall of the shell, and a plurality of convex portions are formed on the outer surface of the outer wall portion of the slot hole.

6. The temperature sensor according to claim 5, wherein the plurality of convex portions on the outer surface of the outer wall portion of the one slot hole are arranged in a row in a transverse direction of the shell and spaced from each other.

7. The temperature sensor according to claim 3, wherein a plurality of slot holes are formed in the second sidewall of the shell, and one convex portion is formed on the outer surface of the outer wall portion of each slot hole.

8. The temperature sensor according to claim 7, wherein the plurality of slot holes on the second sidewall of the shell are arranged in a row in a longitudinal direction of the shell and spaced apart from each other.

9. The temperature sensor according to claim 3, wherein a plurality of slot holes are formed in the second sidewall of the shell, and a plurality of convex portions are formed on the outer surface of the outer wall portion of each slot hole.

10. The temperature sensor according to claim 9, wherein:
the plurality of slot holes on the second sidewall of the shell are arranged in a row in a longitudinal direction of the shell and spaced apart from each other; and
the plurality of convex portions on the outer surface of the outer wall portion of each slot hole are arranged in a row in a transverse direction of the shell and spaced from each other.

11. The temperature sensor according to claim 3, wherein:
the second sidewall has a flat outer surface, the convex portion has a flat top surface and a smooth transition surface located between the top surface and the outer surface of the second sidewall;
the smooth transition surface is used to guide the shell into and out of the sensor slot;
the smooth transition surface is an arc-shaped or inclined surface.

12. The temperature sensor according to claim 1, wherein:
a slot hole is formed in the second sidewall of the shell and separates a portion of the second sidewall into an outer wall portion and an inner wall portion, the outer wall portion of the slot hole is arched outward to form the interference fit portion;
the outer wall portion of the slot hole is adapted to elastically deform towards the interior of the slot hole when it interferes with the inner wall of the sensor slot, resulting in a predetermined contact pressure between the first sidewall of the shell and the conductive terminal to ensure reliable thermal contact between the first sidewall and the conductive terminal.

13. The temperature sensor according to claim 12, wherein the cross-sectional area of the slot hole is elliptical.

14. The temperature sensor according to claim 3, wherein a thickness of a portion of the second sidewall formed with the slot hole is greater than a thickness of a remaining portion of the second sidewall except for the portion formed with the slot hole.

15. The temperature sensor according to claim 3, wherein:
the slot hole runs through the second sidewall along a transverse direction of the shell such that the slot hole is a transverse through hole formed in the second sidewall; or
the slot hole does not run through the second sidewall along the transverse direction of the shell such that the slot hole is a transverse blind hole formed in the second sidewall.

16. The temperature sensor according to claim 3, wherein:
the slot hole runs through the second sidewall along a longitudinal direction of the shell such that the slot hole is a longitudinal through-hole formed in the second sidewall; or
the slot hole does not run through the second sidewall along the longitudinal direction of the shell such that the slot hole is a longitudinal blind hole formed in the second sidewall.

17. The temperature sensor according to claim 1, wherein:

the shell includes a left wall and a right wall that are opposite in a transverse direction of the shell, and a top wall and a bottom wall that are opposite in a height direction of the shell;

the first sidewall is the bottom wall of the shell, and the second sidewall is the top wall of the shell.

18. The temperature sensor according to claim 17, wherein:

the shell further includes a front end wall and a rear port opposite the front end wall;

the temperature sensing element is arranged into the shell through the rear port;

a wire extends into the shell through the rear port and electrically connected to the temperature sensing element; and a thermal conductive sealant is poured into the shell through the rear port.

19. A connector assembly, comprising:

a connector, including:

a connector housing formed with a sensor slot; and a conductive terminal arranged in the connector housing; and a temperature sensor inserted into the sensor slot and adapted to detect a temperature of the conductive terminal in the connector, including:

a shell, including:

a first sidewall in thermal contact with the conductive terminal; and a second sidewall opposite to the first sidewall and including an interference fit portion extending from an outer surface thereof, the interference fit portion forming an interference fit with an inner wall of the sensor slot, a remaining portion of the second sidewall except for the interference fit portion is separated from the inner wall of the sensor slot by a predetermined gap; and a temperature sensing element arranged in the shell.

20. The connector assembly of claim 19, wherein the first sidewall directly contacts the conductive terminal.

* * * * *